US00RE34305E

United States Patent [19]

Sakurai et al.

[11] E Patent Number: Re. 34,305

[45] Reissued Date of Patent: Jul. 6, 1993

[54] SWITCHING SYSTEM AND METHOD OF CONSTRUCTION THEREOF

[75] Inventors: Yoshito Sakurai, Yokohama; Kenichi Ohtsuki, Kanagawa; Shinobu Gohara, Yokohama; Makoto Mori, Yokohama; Akira Horiki, Yokohama; Takao Kato, Yokohama; Hiroshi Kuwahara, Kodaira, all of Japan

[73] Assignee: Hitachi, Ltd., Tokyo, Japan

[21] Appl. No.: 852,544

[22] Filed: Mar. 17, 1991

Related U.S. Patent Documents

Reissue of:

[64] Patent No.: 4,910,731
Issued: Mar. 20, 1990
Appl. No.: 218,217
Filed: Jul. 13, 1988

[30] Foreign Application Priority Data

| | | | |
|---|---|---|---|
| Jul. 15, 1987 | [JP] | Japan | 62-174603 |
| Oct. 9, 1987 | [JP] | Japan | 62-253661 |
| Nov. 11, 1987 | [JP] | Japan | 62-283249 |
| Apr. 27, 1988 | [JP] | Japan | 63-102512 |

[51] Int. Cl.[5] ..... H04Q 11/04

[52] U.S. Cl. ..... 370/67; 370/58.1; 370/60

[58] Field of Search ..... 370/60, 60.1, 58.1, 370/58.2, 58.3, 94.1, 94.2, 94.3, 67, 64, 59

[56] References Cited

U.S. PATENT DOCUMENTS

| | | | |
|---|---|---|---|
| 4,603,416 | 7/1986 | Servel et al. | 370/60 |
| 4,630,258 | 12/1986 | McMillen et al. | 370/60 |
| 4,771,419 | 9/1988 | Graves et al. | 370/60 |
| 4,819,226 | 4/1989 | Beckner et al. | 370/60 |
| 4,905,225 | 2/1990 | Francois et al. | 370/60 |

*Primary Examiner*—Douglas W. Olms
*Assistant Examiner*—Wellington Chin
*Attorney, Agent, or Firm*—Antonelli, Terry, Stout & Kraus

[57] ABSTRACT

A switching system is disclosed in which a plurality of incoming highways are multiplexed in time division cells that have arrived are written into a buffer memory, the cells thus written are read in an appropriate order, separated in a multiplex way and distributed among a plurality of outgoing highways thereby to perform an exchange operation. An FIFO (First In First Out) buffer stores an empty address of the buffer memory. The address in busy state is controlled in a manner corresponding to the outgoing highways. When a cell is written in the buffer memory, the empty address is taken out of the data output of the FIFO buffer. When the cell is read of the buffer memory the address already read is returned to the data input of the FIFO buffer by an idle address chain.

30 Claims, 15 Drawing Sheets

FIG. 7

| INPUT | | | OUTPUT | SELECTION CLASS |
|---|---|---|---|---|
| Q 1 | Q 2 | Q 3 | | |
| 1 | X | X | 0 0 | (C 1) |
| 0 | 1 | X | 0 1 | (C 2) |
| 0 | 0 | 1 | 1 0 | (C 3) |
| 0 | 0 | 0 | 1 1 | (IDLE) |

ADDRESS FIFOs (WITH PRIORITY CONTROL)

SWITCHING SYSTEM AND METHOD OF CONSTRUCTION THEREOF

Matter enclosed in heavy brackets [ ] appears in the original patent but forms no part of this reissue specification; matter printed in italics indicates the additions made by reissue.

BACKGROUND OF THE INVENTION

The present invention relates to a switching system for exchanging time-shared multiplex communication data such as voice and data using a fixed-length cell with a routing header, or more in particular to a switching system suitable for exchanging the burst exchange data and the channel exchange data such as voice integrally.

A versatile and economical switching system is required which is capable of integrally handling communications not only of the bit rate (64 Kb/s) of typical telephone voice but also of various bit rates from low-speed (several hundred b/s) data to video signal (several Mb/s) and various characteristics (burst and real time characteristics).

A promising method expected to meet this requirement involves switching all data uniformly using a fixed-length cell with a header containing routing data. The switching system disclosed in a report entitled "A study of an Integrated Line/Packet Message Channel", presented to Exchange Division 1832, National General Conference (1988) in memory of the 70th anniversary of the foundation of the Electronic Information Communications Society is an example. In this example, all communications data is transferred by use of a fixed-length block called a "cell". The switching is derived from a space switch, and in order to prevent a plurality of cells having the same address from colliding with each other in the space switch, a timed switching function is provided for each incoming highway. Further, the timed switching function includes a switching memory and a waiting buffer memory to realize a line exchange mode requiring a real time characteristic such as telephone voice and a burst exchange mode in which data is sent in burst fashion with some delay which may be allowed. The line exchange mode cell is handled preferentially not through a buffer memory for guaranteeing the real time characteristic, while the burst exchange mode cell is kept waiting in the buffer memory and is processed when there is any empty time slot.

Another example of the prior art is "TDM Switching System" disclosed in the JP-A-59-135994. This system, though lacking an express description of the concept of handling two types of characteristics including the line exchange mode and the burst exchange mode, is equipped with a function to replace the fixed-length cell in terms of time by use of a buffer memory. In the process, the same buffer memory is used for waiting for a cell and switching thereof. In other words, in order to accomplish the required waiting, the write address into the cell buffer memory is known from the header. The system comprises waiting matrix means to be stored according to the address of the cell.

In the case where a plurality of fixed-length cells are used for the switching operation, the fact that the cell addresses are not always uniformly distributed may cause the cells destined for the same address to be concentrated temporarily into an overcrowded condition for the cells to be lost by memory overflow. In the system disclosed in the report of the present application cited first above, a waiting buffer memory is provided for each highway outgoing to each address to avoid such an overcrowded condition. This buffer memory is required to have a sufficient capacity to store as many cells as required to prevent overflow, and that it is necessary that such a buffer memory is required for each address separately. The resulting problem of this configuration is the necessity of a great capacity of memory. The second-cited switching system (JP-A-59-135994), on the other hand, comprises a single buffer memory for all incoming highways and a plurality of waiting matrix means for the cell addresses respectively to store only the addresses of the buffer memory. This construction is capable of absorbing the lack of uniformity among the cells with a comparatively small storage capacity. The periodic use of the write addresses of the buffer memory, however, places the system with the buffer memory in logically the same state as if fixedly divided for each address. When the waiting time for a given cell of the waiting matrix exceeds a predetermined length, for example, the same write address is used to cause an overwrite of the buffer memory in spite of the fact that there still remain cells yet to be read. The cell overwritten is erased undesirably.

SUMMARY OF THE INVENTION

The object of the present invention is to provide a switching system which solves the above-mentioned problem of the prior art by eliminating the volume use of a memory and in which cells are not lost by the overwriting of a buffer memory.

In order to achieve the above-mentioned object, there is provided according to the present invention a switching system comprising a plurality of incoming highways (hereinafter referred merely as the "incoming lines") multiplexed in time-sharing fashion, a buffer memory (hereinafter referred to as the "main buffer") into which the arriving cells are written, means for reading the cells from the main buffer memory in appropriate sequence, separating them in multiplexed way and distributing them among a plurality of outgoing highways (hereinafter referred merely as the "outgoing lines") thereby to accomplish the exchange operation, a FIFO (First In First Out) buffer (hereinafter referred to as the "idle Address FIFO") for storing empty addresses of the main buffer memory, means for controlling busy addresses for corresponding outgoing lines, and an idle address chain for retrieving a vacant address from the data output of the idle address FIFO buffer at the time of writing a cell into the main buffer and returning the read address into the data input of the idle address FIFO buffer at the time of reading a cell from the main buffer.

In writing an arriving cell in the main buffer, an empty address is obtained from an idle address FIFO regardless of the outgoing line addressed by the cell. Therefore, as long as the main buffer has an empty address, the cell can be written into any region in the main buffer. Even if the addresses of the arriving cells are concentrated at a specified outgoing line, the cells to other addresses should be reduced proportionately, so that the required capacity of the main buffer remains unchanged.

Further, until a cell is read out, the address storing the particular cell is not returned to the idle address FIFO, thereby eliminating the disadvantage which otherwise might result with a cell being overwritten on the same address erasing another cell stored therein.

BRIEF DESCRIPTIONS OF THE DRAWINGS

FIG. 7 is a diagram for explaining the logics of the read access control in FIG. 6.

DESCRIPTION OF THE PREFERRED EMBODIMENTS

Figure 1:
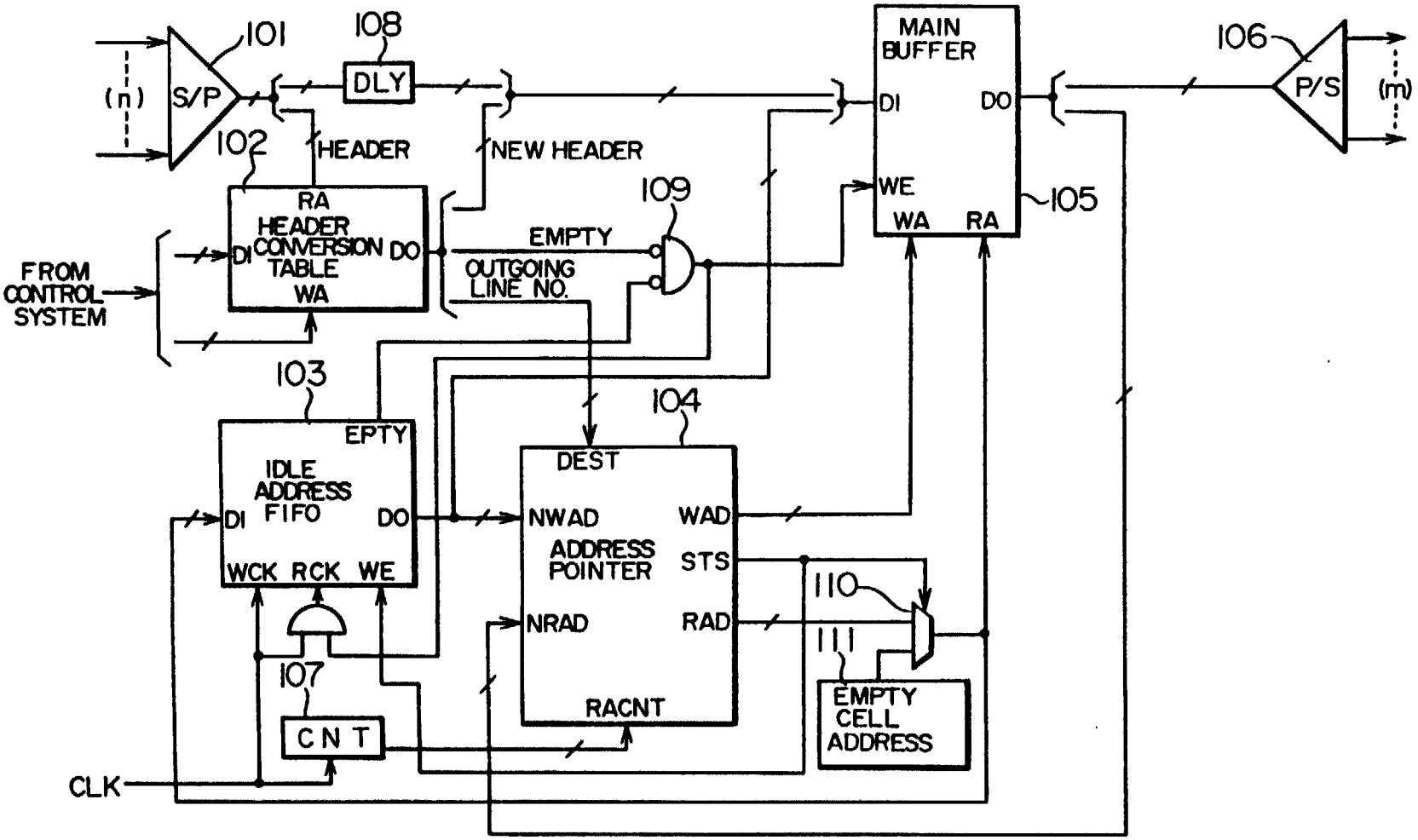
FIG. 1 is a functional block diagram showing an embodiment of the present invention.

An embodiment of the present invention will be explained with reference to FIG. 1. In FIG. 1, a number n of incoming lines are connected through a series-parallel conversion multiplexer 101 to a data input (DI) of a main buffer 105. The data output (DO) of the main buffer 105 is connected to a parallel-series conversion multiplex separator and is separated into a number m of outgoing lines. The output portion of the series-parallel conversion multiplexer 101 which corresponds to the cell header is connected to a read address terminal (RA) of a header conversion table 102. The data output (DO) portion of the header conversion table 102 which corresponds to a new header, on the other hand, is connected to the data input of the main buffer 105, the portion thereof corresponding to an empty/busy data (0 for empty) connected through an AND gate 109 to a write enable input (WE) of the main buffer 105, and the outgoing number portion thereof connected to a destination outgoing number input (DEST) of an address pointer 104. The data input (DI) and the write address (WA) of the header conversion table 102 are connected to a control system not shown. The data output (DO) of the idle address FFFO 103 is the data input (DI) of the main buffer 105 and connected to the next write address (NWAD) of the address pointer 104. The empty indication output (EPTY) is connected to the write enable input (WE) of the main buffer 105 through the AND gate 109. The write address output (WAD) of the address pointer 104 is connected to the write address input (WA) of the main buffer 105. The read address output (RAD), on the other hand, is connected through a selector 110 to the read address output (RA) of the main buffer 105 and the data input (DI) of the idle address FIFO 103. The portion of the data output (DO) of the main buffer 105 corresponding to the next read address is connected to the next read address input (NRAD) of the address pointer 104, and the other portions thereof, that is, those portions corresponding to the cell body, are separated through the parallel-series conversion multiplex separator 106 into each outgoing line. The output of the control counter 107 is connected to the read counter input (RACNT) of the address pointer 104. The empty address register 111 is connected to the input of the selector 110. The cue state indication output (STS) of the address pointer 104 is connected to both the selection input of the selector 110 and the write enable input (WE) of the idle address FIFO 103 at the same time.

First, the write operation of the cell into the main buffer will be explained.

Figure 2A:
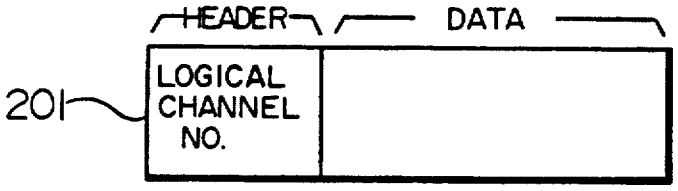
FIGS. 2A to 2C are diagrams for explaining a cell construction used in the embodiment of FIG. 1.
Figure 2B:
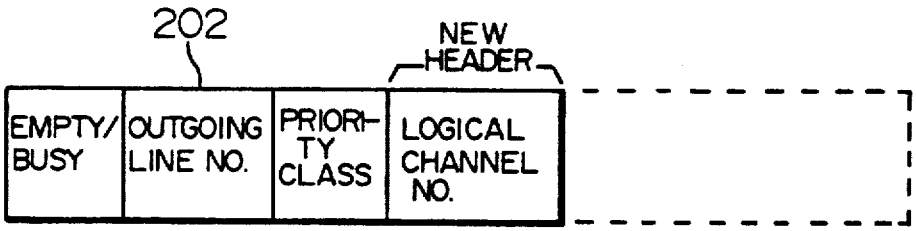
Figure 4:
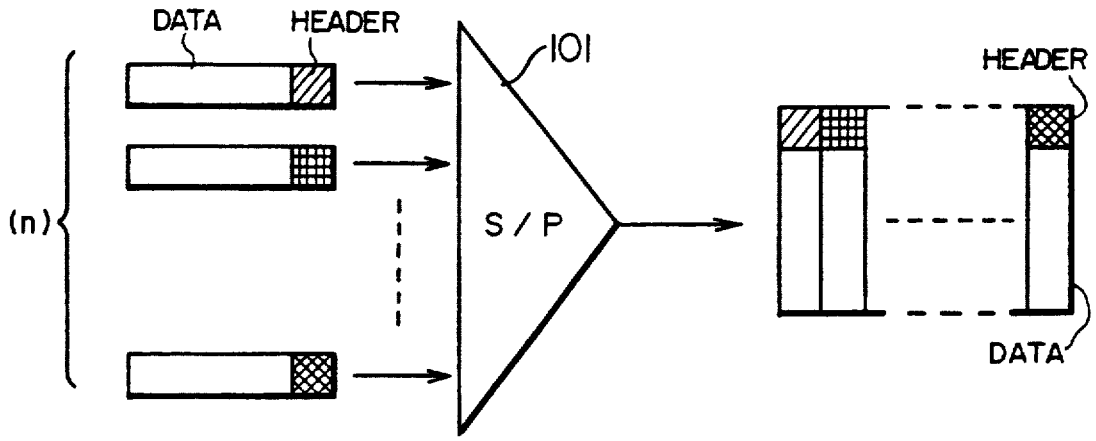
FIG. 4 is a diagram for explaining the operation of a series-parallel conversion multiplexer included in FIG. 1.

The cells that have arrived from respective incoming lines are subjected to series-to-parallel conversion at the series-parallel conversion multiplexer 101 to facilitate the handling of each cell separately. An example of the construction of the cell arriving from the incoming lines is shown in FIG. 2A, and the concept of the series-parallel conversion multiplexing in FIG. 4. The series-parallel conversion multiplexer is generally made up of a well-known current called "the barrel shifter". As shown in FIG. 2A, the cell header carries a logic channel number written thereon, whereby the header conversion table 102 is accessed to obtain the data as to whether the cell of a new logic channel number on the outgoing line side is empty or occupied and a cell destination outgoing line number. This data is written in the table with the access from the control system at the time of setting a call. FIG. 2B shows an example of the output of the header conversion table 102.

The cell destination outgoing line number is applied to the address pointer 104, and an appropriate write address is obtained accordingly. The write address is applied in advance from the idle address FIFO 103. The cell is written into the main buffer 105 by use of this same write address. If the cell is empty or the idle address FIFO is empty (that is, the main buffer has no empty address), the output of the AND gate 109 is "L", and therefore no data is written in the main buffer 105. At the same time, the read clock (RCK) of the idle address FIFO is also "L" so that the no output of the empty address is produced.

Now, the read operation will be explained. The cell is read in accordance with the number generated by the control counter 107, and a read address is obtained from the address pointer 104 and is used as a read address of the main buffer. The value of the control counter 107 corresponds to the outgoing line number. Specifically, cells are read one by one sequentially for each outgoing line. The address used as a read address is applied to the data input (DI) of the idle address FIFO 103 and is used again as a write address. If there is no cell addressed to a given outgoing line in the main buffer, a cue state indication output (STS) is produced, so that an address stored in the empty cell address register 111 is selected as a read address of the main buffer 105 by the selector 110. The data in the main buffer corresponding to this address is always kept as an empty cell.

Figure 2C:
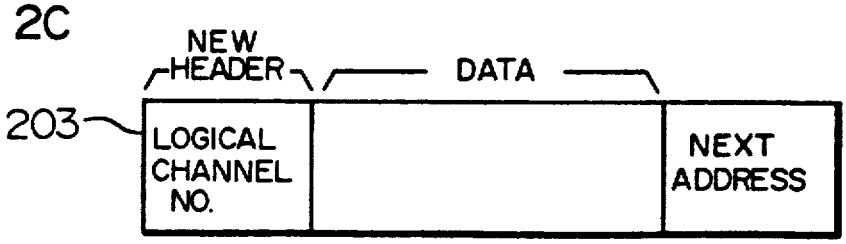

The data output (NWAD) of the idle address FIFO is stored in the main buffer together with the cell as next address information. This is to indicate the storage address of the next cell at the same destination as the cell destination outgoing line. A detailed operation will be explained below with reference to FIG. 3. The cell construction in the main buffer is shown in FIG. 2C.

Figure 3:
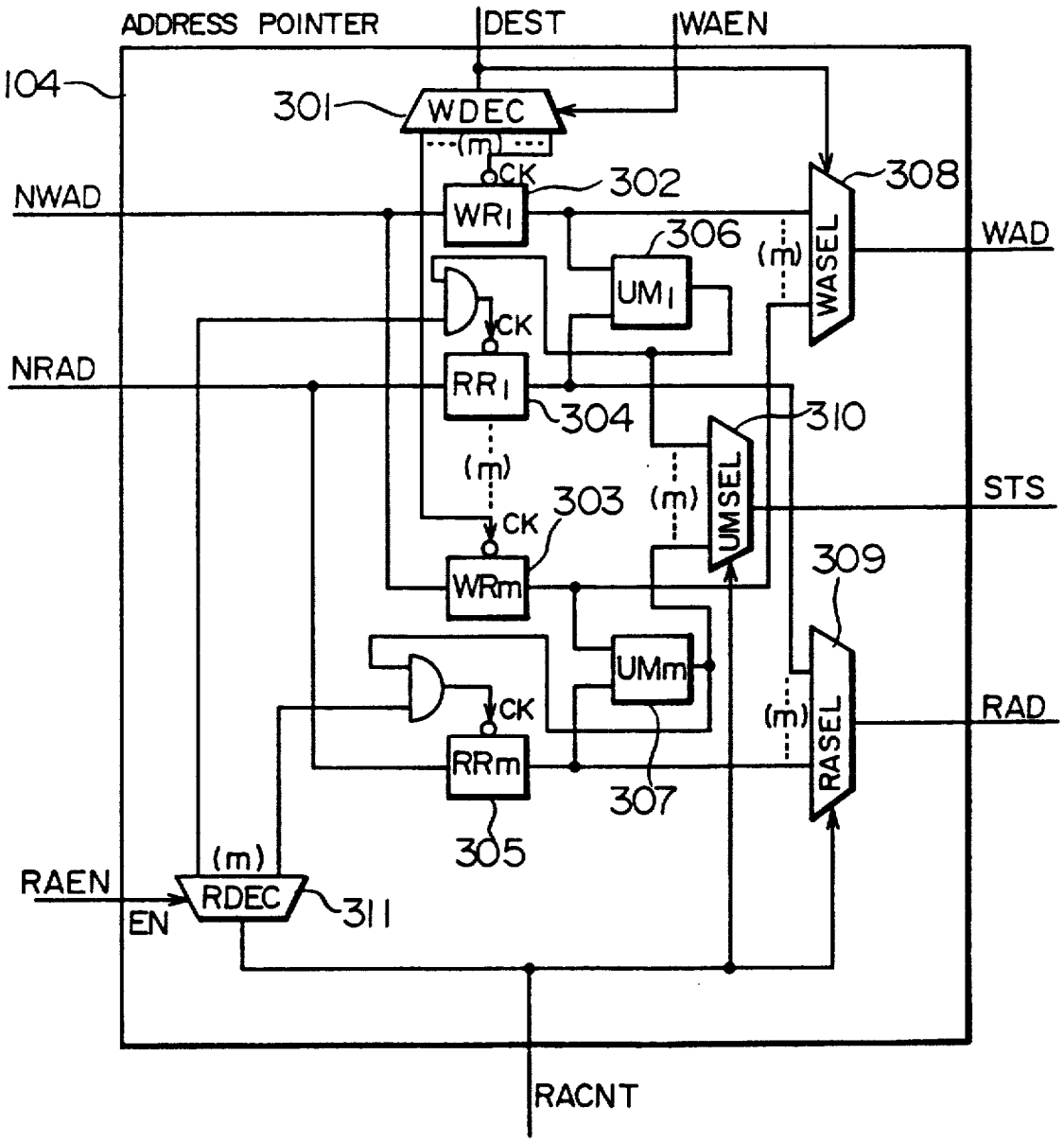
FIG. 3 is a detailed functional block diagram showing and address pointer included in FIG. 1.

Now, the configuration and operation of the address pointer 104 will be explained with reference to FIG. 3. The outgoing number input (DEST) is connected to the input of the outgoing line number decoder 301 and the selection input of the address selector 308. A number m of decode outputs of the outgoing number decoder 301 are connected respectively to the clock inputs of a number m of write registers ($WR_{1\ to\ m}$) 302 to 303. The next write address (NWAD) applied from an external idle address FIFO is connected to the input of each write register, and the output of each write register is produced as a write address output (WAD) through the write address selector 308. The control counter input (RACNT), on the other hand, is connected to the decoder 311 and the selection input of the read address selector 309. A number m of decode outputs of the decoder 311 are connected as clock inputs of a number m of read registers ($RR_{1\ to\ m}$) 304 to 305, respectively through a gate. The next read address input (NRAD) from an external source is connected to the input of each read register, the output of which makes up a read address (RAD) through the read address selector 309. Non-coincidence detectors 306 to 307 are supplied with outputs of a corresponding write register, and read register respectively, the outputs of which make up a cue state indication output (STS) through a non-coincidence data selector 310. The outputs of the non-coincidence detectors, on the other hand, are also connected to one of the inputs of the gate.

The portions of a number m of outputs of the write registers corresponding to the outgoing lines thereof are selected by the write address selector 308 in response to the outgoing line number input (DEST) thereby to make up an address output (WAD). In the process, a corresponding value held in the write register by the decode output of the outgoing line number decoder 301 is updated to the value (NWAD) supplied from the idle address FIFO. As a result, the NWAD value immediately before being updated corresponds to the write address for the next-arriving cell of the same address as the destination outgoing line number of the cell to be just written. If this NWAD value is stored in the main buffer together with the cell about to be just written, therefore, it is possible to know, when this cell is read out, from which address the next cell destined to the same outgoing line is to be read. In reading a cell, a read register output is selected by a read address selector with the value of the control counter 107 as a selection input, and the value held in the register is produced as a read address output (RAD). This output is thus used as a read address output. At the same time, the value held in the read register selected is updated by the output of the decoder 311. The input of the read register involved is the next read address stored together with the cell at the time of the write operation which is read out of the main buffer, and therefore the address of the next cell destined to the same outgoing line can be held in the read register.

Figure 5:
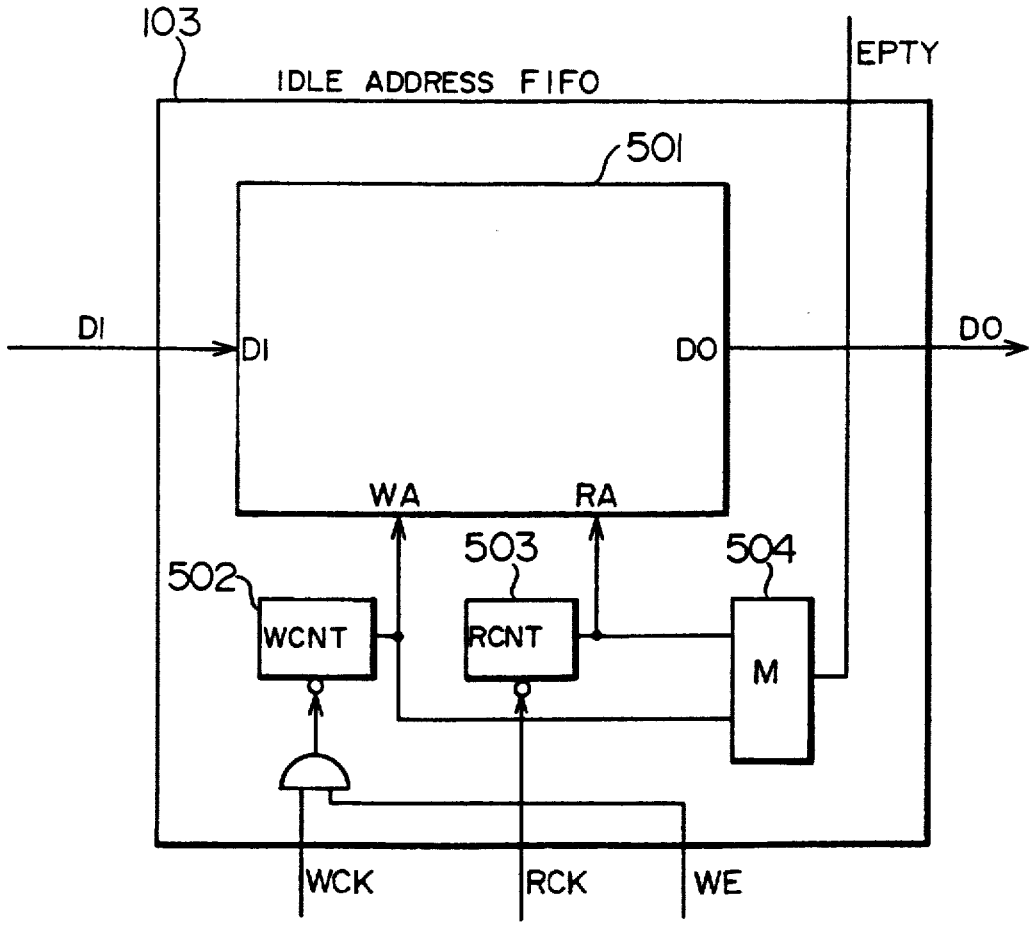
FIG. 5 is a detailed functional block diagram showing an idle address FIFO included in FIG. 1.

FIG. 5 shows a configuration of the idle address FIFO 103. The idle address FIFO 103 includes a memory 501, a write counter (WCNT) 502, a read counter (RCNT) 503 and a coincidence detector 504. The write counter 502 is a ring counter for producing a write address (WA) and counting the same number as the addresses of the memory 501. The read counter 503 is for producing a read address (RA) and makes up a ring counter for counting the same number as the addresses of the memory 501. When the values of these two counters coincide with each other, it indicates the memory is empty. This condition is detected by the coincidence detector 504 to produce an empty output (EPTY). In this way, this circuit has the same function as a FIFO as a whole.

Figure 6:
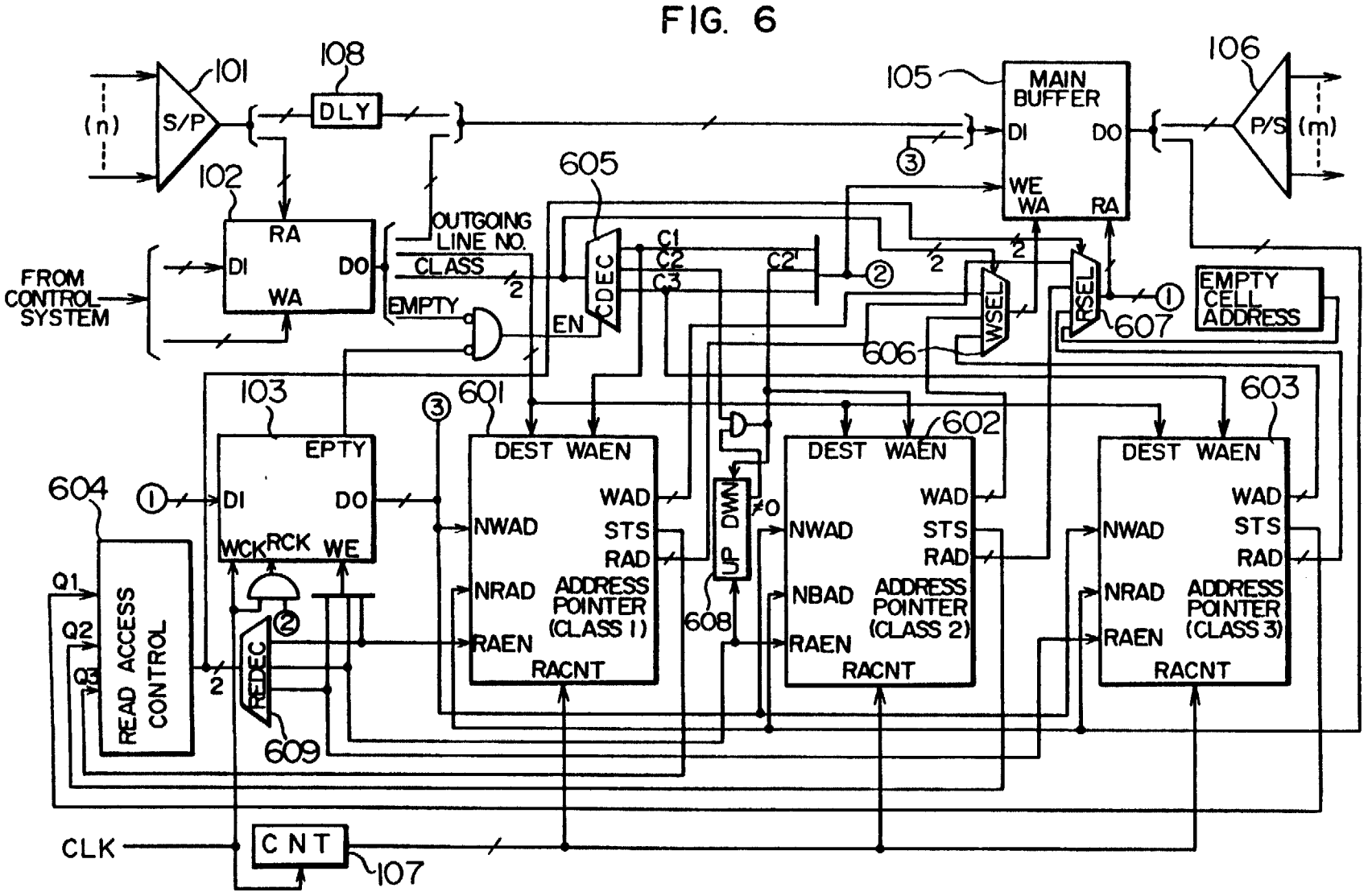
FIG. 6 is a functional block diagram showing another embodiment of the present invention.

Now, another embodiment of the invention will be explained with reference to FIG. 6. The switching system shown in FIG. 6 operates basically on the same principle as the one shown in FIG. 1. In addition, however, the system in FIG. 6 has a preferential control mechanism. In FIG. 6, the component parts identical to those in FIG. 1 are denoted by the same reference numerals as in FIG. 1 respectively and will not be described again. The embodiment of FIG. 6 is different from that of FIG. 1 most conspicuously in that the embodiment of FIG. 6 has a plurality of address pointers. It is assumed that there are three preferential classes called class 1(C1), class 2(C2) and class 3(C3).

The output of the header conversion table 102 in FIG. 6 includes a class indication. The class indication output is connected to the input of the class decoder (CDEC) 605 and the selection input of the write class selector (WSEL) 606. Each decoder output of the class decoder (CDEC) 605 is connected to the write address enable input (WAEN) of the address pointer of each corresponding class. Of the decoder outputs of the class decoder (CDEC) 605, the output C2 is changed into C2' through an AND gate supplied with the output of the up-down counter 608. The outputs C1, C3 of the class decoder (CDEC) 605 and the OR output of C2' are connected to the write enable (WE) of the main buffer 105. Each cue state indication output (STS) of the address points corresponding to each class including the address pointer (class 1) 601, address pointer (class 2) 602, and the address pointer (class 3) 603 is connected to the input of the read access control 604. The relationship between the input and output of the read access control is shown, for example, in FIG. 7. The output of the read access control 604 is connected to the input of the read class selector (RSEL) 607 and the decoder (REDEC) 609. The decode output of the decoder (REDEC) 609 is connected to the read address enable input (RAEN) of the address pointer of a corresponding class on the one hand and a logical sum of the decode outputs is connected to the write enable input (WE) of the idle address FIFO on the other hand. The up-down counter 608 is supplied with the read address enable input (RAEN) of class 2 as an up input and C2' as a down input. The classes are so defined that class 1 is small in delay tim with a low cell loss rate, class small in delay time with somewhat large cell loss rate, and class 3 somewhat long in delay time with small cell loss rate. Class 2, in spite of a somewhat larger cell loss rate, is superior to other classes, and therefore limits the usable capacity of a main buffer. Specifically, the capacity usable for the up-down counter 608 is set by conversion in the number of cells. The up-down counter 608 is decremented by write and incremented by read when this counter becomes zero, therefore, it indicates that the main buffer is used to the limit. Under this condition, the output C2' becomes "L" and no new write occurs for this class. As a result, the class 2 cell that has arrived is discarded. On the other hand, the read priority order is set by the read access control in such a manner that the class 1 has the least delay time and the class 3 the largest. Specifically, the operation is performed for each outgoing line in such a way that if the class 1 cell is in the main buffer, it is read in the first place, and when the class 1 cue disappears, the class 2 cell is read out. With the disappearance of the class 2 cue, the class 3 cell is read out.

With the arrival of a cell, the class to which the particular cell belongs is identifiable by the output of the header conversion table 102, so that the write address enable output (WAEN) is applied to the address pointer corresponding to the particular class by the class decoder 605. The write address output (WAD) produced from the address pointer, on the other hand, is selected by the write class selector (WSEL) 606 and is used as a write address (WA) for the main buffer. In read operation, by contrast, as mentioned earlier, the read access control 604 monitors a waiting cue corresponding to each outgoing line of each class, and effect control to assure that outputs are in the order of priority among the waiting cues. Specifically, the decode output of the decoder 609 designates an address pointer of the class to be read, and the read class selector 607 selects a read address output produced from the address pointer of the class to be read, thus determining the read address of the main buffer.

Figure 8:
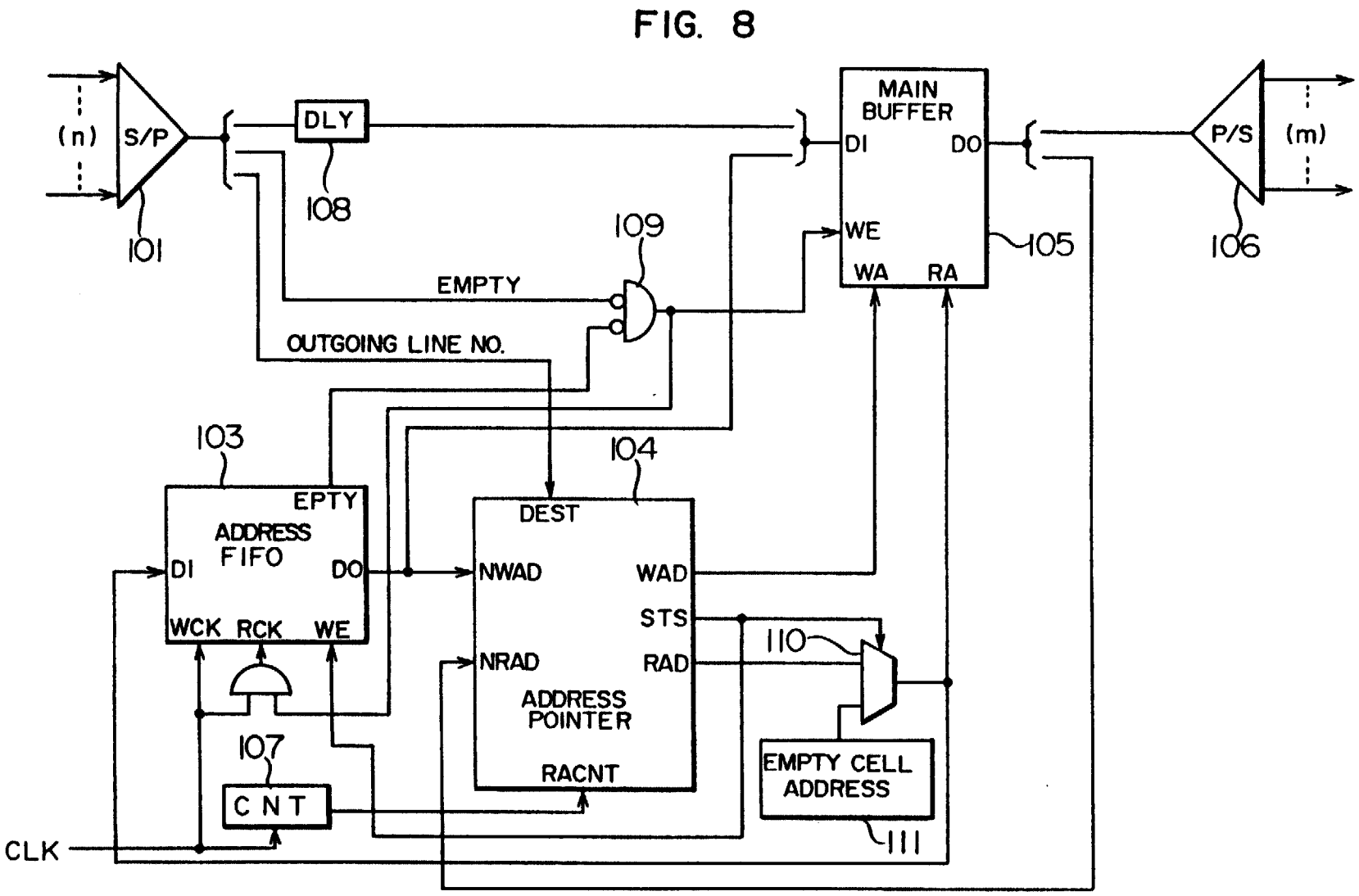
FIG. 8 is a functional block diagram showing still another embodiment of the present invention.
Figure 9:
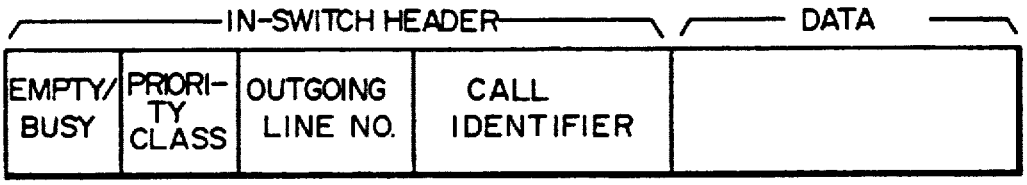
FIG. 9 is a diagram for explaining a cell construction used in the embodiment of FIG. 8.

Now, another embodiment of the present invention will be explained with reference to FIG. 8. The configuration of FIG. 8 is free of the header conversion table 102 in FIG. 1. In the case under consideration, the construction of the cell arriving from the incoming line is shown in FIG. 9. This configuration is suitable for the case in which a header conversion table is included for each incoming line in the front stage of the switch. This configuration also has an advantage that in a multi-stage construction mentioned later, the header conversion may be rendered collectively in advance without respective header conversion by switches in the respective stages.

In each of the embodiment explained above, the main buffer and the idle address FIFO, or the main buffer, idle address FIFO and the address pointer may be formed in integrated circuits on the same chip. Then, a compact switch and a multi-stage construction described later are realized.

Figure 10:
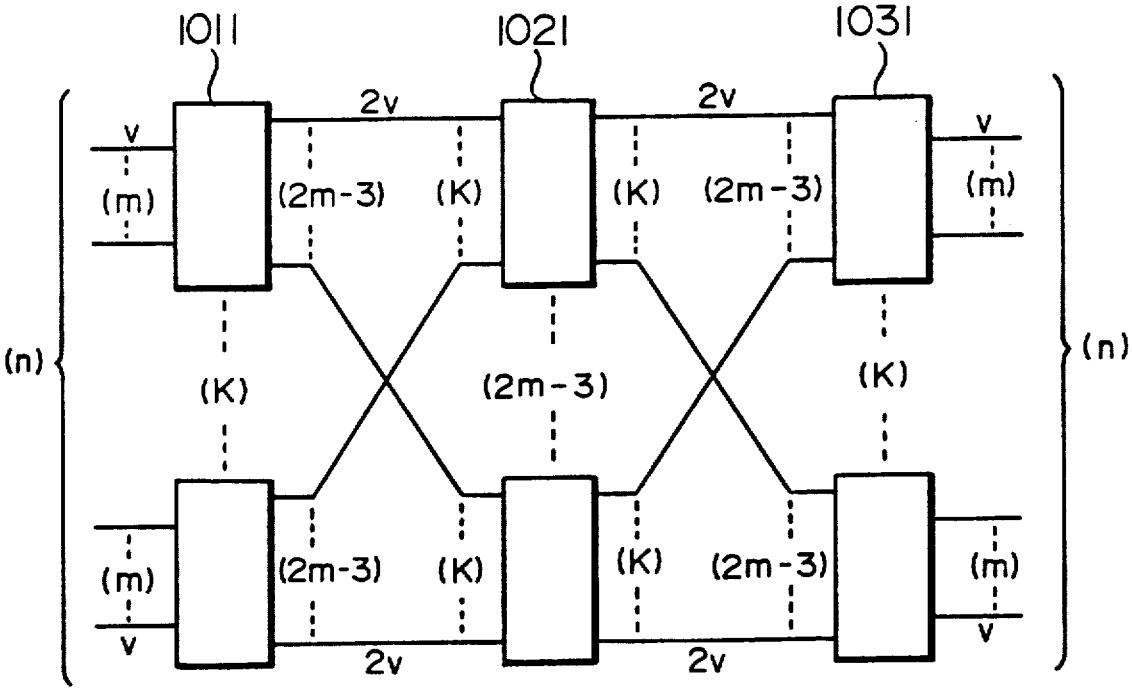
FIGS. 10 and 11 are diagrams for explaining a further embodiment of the present invention.

Now, an embodiment of a switch of a multi-stage construction (multi-stage channel switch) will be explained with reference to FIGS. 10 and 11. First, before a specific example, the non-block conditions of a multi-stage switch will be explained.

A conventional non-block multi-channel switch of Clos type is well known for circuit switch. (See Akimaru: "Outline of Current Exchange Engineering" published by Ohm, 1979, pp. 136 to 137, and C. Clos: A Study of Non Blocking Networks, Bell System Technical Journal vol. 32, No. 3 (1953)).

A Clos-type multi-stage switch is assumed to have a number m of incoming lines of a primary switch, a number r of outgoing lines thereof, a number k of the incoming and outgoing lines respectively of a secondary switch, a number r of incoming lines of the tertiary switch and a number m of outgoing lines thereof, a number k of the primary switches, a number r of the secondary switches, and a number k of the tertiary switches, so configured that one each of the r outgoing lines of the primary switch is connected to each of the secondary switches, and one each of the k outgoing lines of the secondary switch to each of the tertiary switches. This multi-stage switch construction thus has three stages to satisfy the relationship $r \geqq 2m-1$ (Clos's formula).

The "non-blocking" is defined to indicate that if both the incoming and outgoing lines of a switch have an empty capacity, there always exists a bus connecting them.

The Clos-type switch is "non-blocking" if it handles a plurality of calls of a single speed. In the case where each of the calls has a given speed, however, the operating efficiency of the link connecting the unit switches is reduced, and therefore the switch is not "non-blocking". If respective calls are different in speed, a call of low speed may, for example, occupy a part of the link capacity, so that in spite of some empty capacity of the link, a high-speed call may not enter there. Due to this what is called a "decayed phenomenon", the link operating efficiency is reduced, and therefore a blocking occurs even though Clos's equation may be satisfied.

This problem is solved by increasing the links of the multi-stage switch spatially, that is, by increasing not only the number of the links but also the "timing" thereof with an increased link speed. Specifically, although the number of incoming and outgoing lines and links are assumed to be m and r respectively, a switch configuration is such that if the speed of the incoming and outgoing lines is assumed to be unity, the link speed is x times higher to satisfy the relationship $r > 2\{(m-1)/(x-1)\}-1$.

In this equation, $(m-1)$ on the right side indicates the state in which $(m-1)$ of m incoming lines are busy. $(x-1)$, on the other hand, is the link speed ratio x, less the unity representing the incoming line speed ratio, indicating a limit value of $\Delta \rightarrow 0$ in a state of $(x-1+\Delta)$ where a given link is busy except for a capacity short of a very small amount $\Delta$ in a single incoming line in terms of speed.

Thus, $[(m-1)/(x-1)]$ indicates the number of links in state that in spite of a certain empty capacity in the link, a single incoming line cannot be accomodated, that is, a state where each link is used most inefficiently. The symbol $\alpha$ indicates a minimum integral number over $\alpha$. It is thus seen that a number $\{[(m-1)/(x-1)]-1\}$ of links except for one are in such a state for both outgoing and incoming lines. Therefore, when the number of links twice as many that is, $2\{[(m-1)/(x-1)]-1\}$, one new incoming line cannot be accomodated in the links, and if there is another accomodatable link, that is, if the number is $2\{[(m-1)/(x-1)-1]\}+1$, both the incoming line side (primary link) and the outgoing line side (secondary link) have a link sharing an empty capacity of at least one channel of incoming line.

Thus, if the number r of the links satisfies the relations $r \geqq 2\{[(m-1)/(x-1)]-1\}+1$, this switch will never block.

An embodiment of the present invention will be explained below with reference to FIG. 10. As shown in FIG. 10, the number n of incoming and outgoing lines is given as $n=mk$. A number k of unit switches with a number m of input terminals and a number $(2m-3)$ of output terminals are arranged as first-stage switches. On the other hand, intermediate-stage switches include a member $(2m-3)$ unit switches with a number k of input and output terminals, and final-stage switches a number k of unit switches with a number $(2m-3)$ input terminals and a number m of output terminals. As shown in FIG. 10, the respective unit switches are connected to each other in such a way that the unit switches making up the first-stage switches are connected to all the unit switches of intermediate stage, and those making up the intermediate stage to all the unit switches making up the final stage. In the above-mentioned equation for non-blocking conditions, $r \geqq 2\{[(m-1)/(x-1)]-1\}+1$, the embodiment under consideration is associated with a case in which $x=2$ and $r=2m-3$, satisfying an equality.

The unit switches in each stage may be made up of those explained with reference to FIGS. 6 and 8 or FIGS. 12 and 16.

Figure 11:
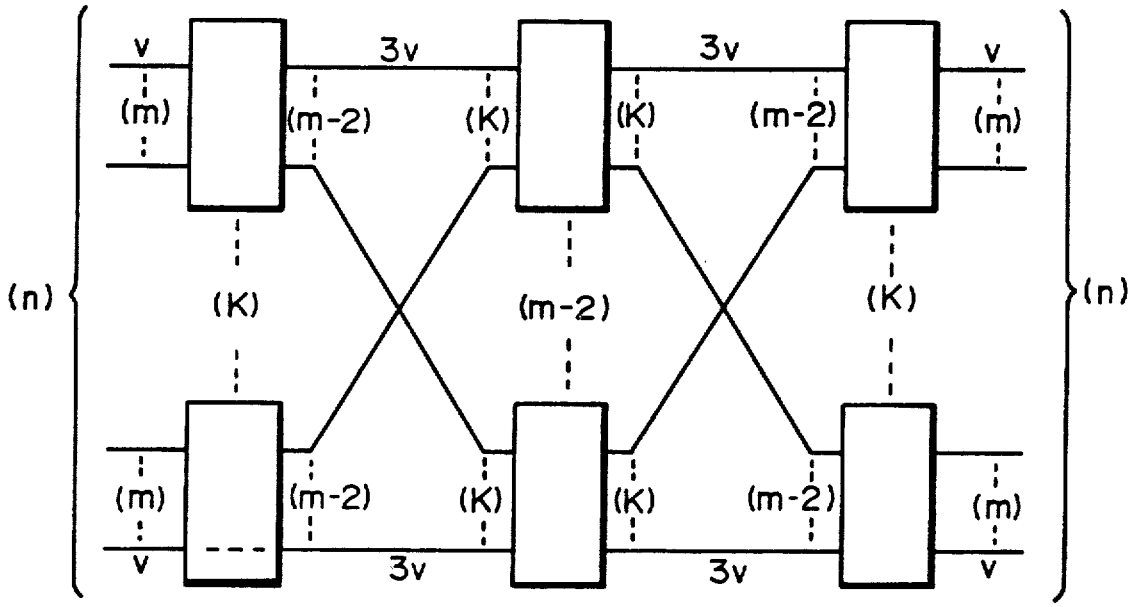

Now, another embodiment of the multi-stage message channel switch is shown in FIG. 11. Unlike in the embodiment of FIG. 10 in which $x=2$ and $r=2m-3$ in the above-mentioned equation for non-blocking conditions $r \geqq 2\{[(m-1)/(x-1)]-1\}+1$, the embodiment under consideration is associated with a case in which $x=3$ and $r=m-2$. In this case, too, an equality is satisfied. The same approach to the configuration may apply as in FIG. 10. The configuration of unit switches is also similar to that of the first embodiment in specific points and therefore will not be explained more in detail.

According to those embodiments, a multi-stage switch capable of non-blocking exchange is realized with the required minimum construction requirements.

Figure 12:
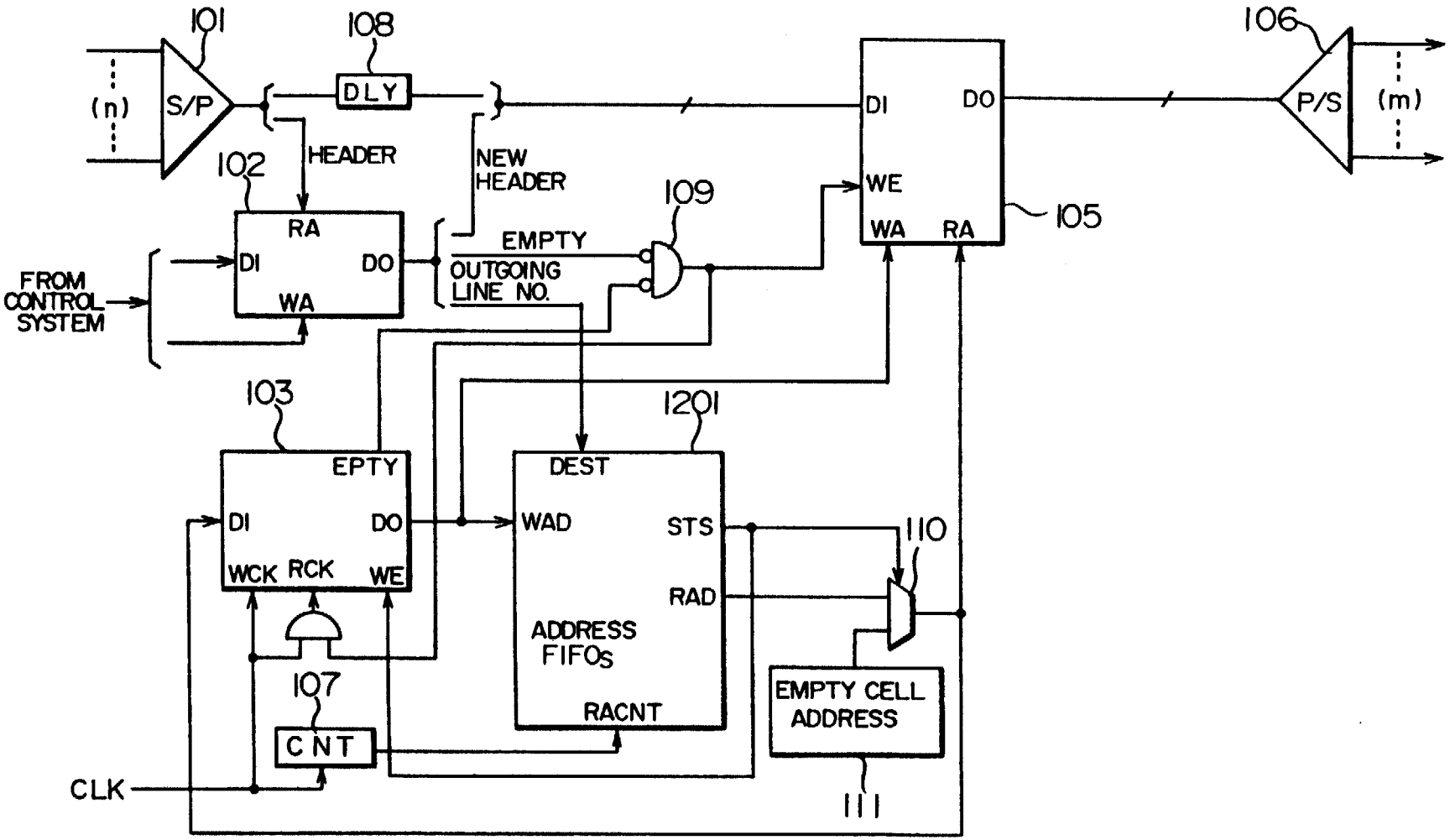
FIG. 12 is a functional block diagram showing still another embodiment of the present invention.

Now, still another embodiment of unit switches will be explained with reference to FIG. 12. In FIG. 12, the configuration is the same as that in FIG. 1 except for address FIFOs 1201, the only difference being in connections. In the embodiment of FIG. 12, the data output (DO) of the idle address FIFO 103 is directly connected to the write address (WA) of the main buffer 105. The main buffer 105 is written only with the cell body, but not with the next address data. The address FIFOs 1201 making up a point of this configuration will be explained with reference to FIG. 13.

The outgoing line number input (DEST) is connected to the outgoing line number decoder (WDEC) 1301, and the m decoder outputs thereof connected to the write signal inputs (WCK) of a number m of FIFO buffers 1303 to 1304. The data input of the FIFO buffers 1303 to 1304 make up the data output of the idle address FIFO in FIG. 12. The data output of the FIFO buffers 1303 to 1304 make up a read address output (RAD) through the read address selector 1305. The read address selector 1305 uses a control counter input (RACNT) as a selection input. The control counter input (RACNT) is further connected to the input of the read sequence decoder 1302 and the selection input of the empty state selector (EPSEL) 1306. The decode output of the read sequence decoder 1302 is connected to the read signal (RCK) input of each FIFO buffer. The empty state signal (EP) of each FIFO buffer makes up a cue state indication output (STS) through empty state selector (EPSEL).

In this embodiment, at the time of writing a cell, an empty address from the idle address FIFO is taken out, and used as the write address of the main buffer as it is. At the same time, the same address is written in the FIFO buffer corresponding to the cell destination outgoing line number in the address FIFOs 1201. At the time of reading, on the other hand, addresses are taken out sequentially from the FIFO buffers, and with these addresses as read addresses, the cells are read out of the main buffer. When the FIFO buffers are empty, an EP output is produced.

In this configuration, the bufferable number of cells for each outgoing line is limited by the capacity of the FIFO buffers in the address FIFOs. If this capacity is set to a sufficiently large value, however, this configuration is simple as a whole.

Figure 14:
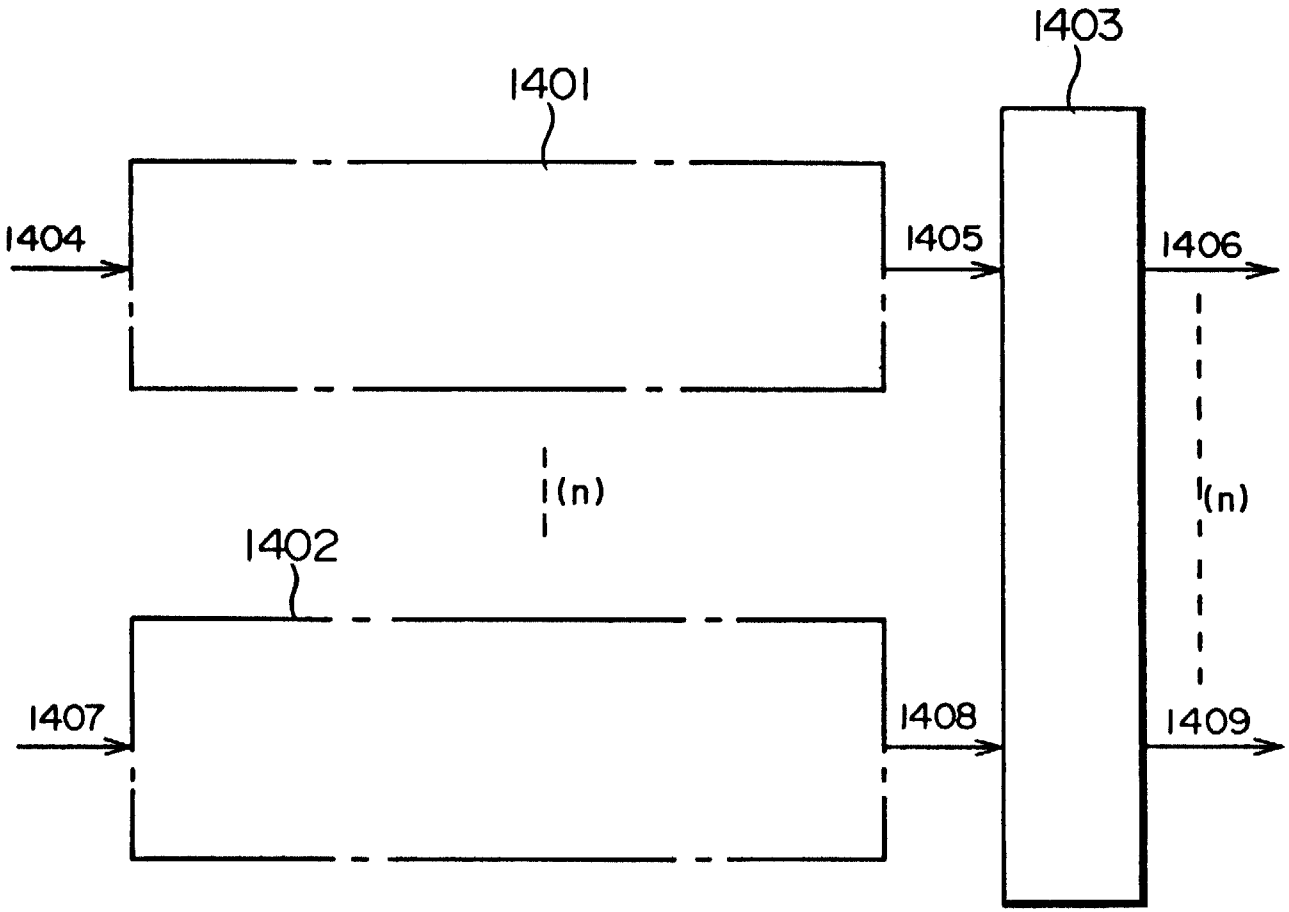
FIG. 14 is a diagram for explaining still another embodiment of the present invention.

FIG. 14 shows an embodiment of an enlargement of the switch scale. It comprises header drive-type time switches 1401 to 1402 and a header drive-type space switch 1403. The header drive-type time switches 1401 to 1402 correspond to the incoming lines, and each of the outputs thereof is used an input to the header drive-type space switches.

Figure 15:
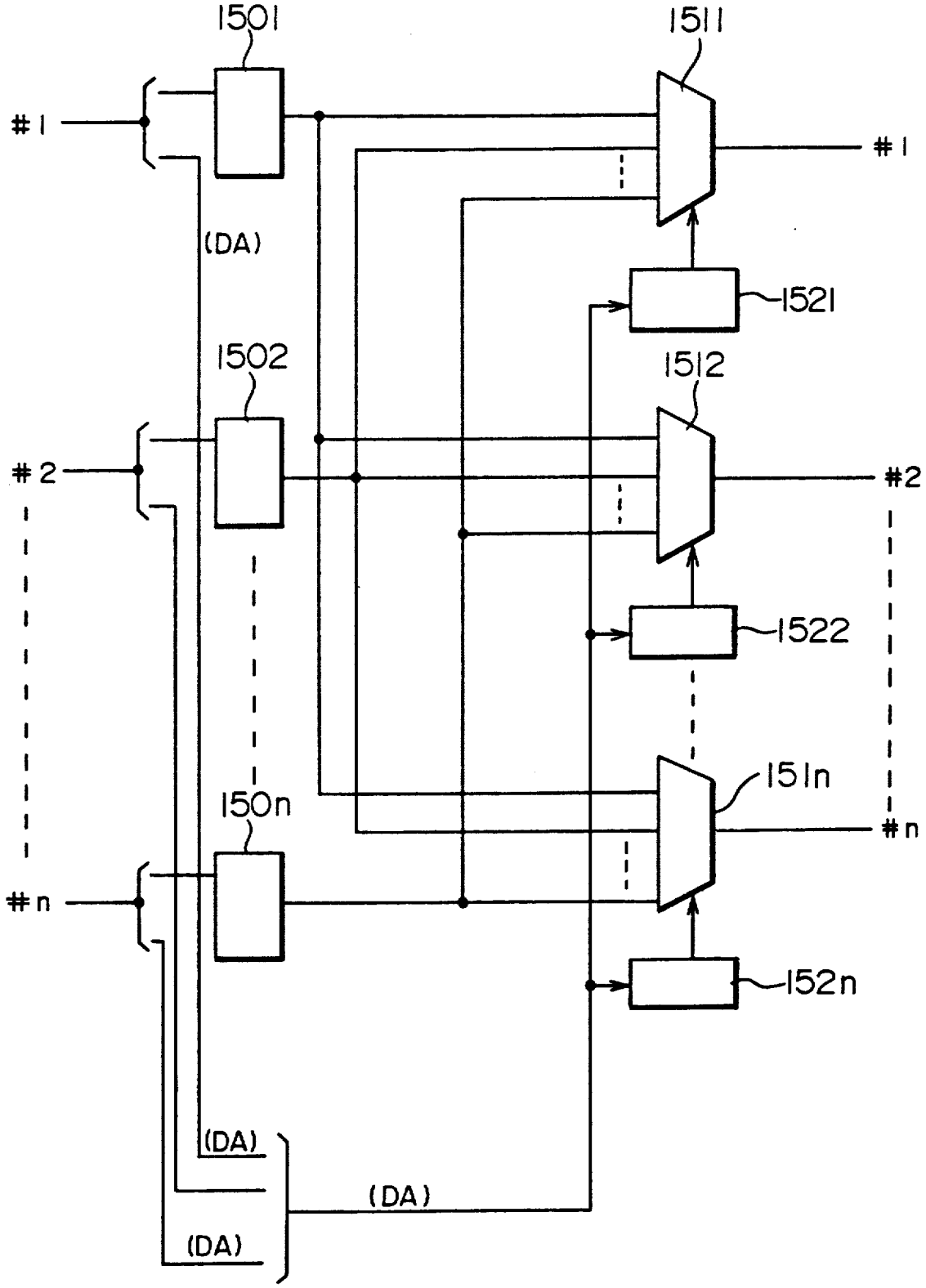
FIG. 15 is a functional block diagram showing a space switch included in FIG. 14.

The header drive-type time switch is defined as a switch for replacing the chronological order of cells in accordance with the header data, and specifically, may comprise a switching system shown in FIG. 1, 6, 8 or 12 (except for the multiplexing and multiplex separator) described above. These switching systems depend on the value of the control counter for their cell reading. If the control counters of the n header drive-type time switches in FIG. 14 are set to always different values (for example, by displacing by one for each), therefore, all the cells read at the same time have different destination outgoing line numbers. As a result, in the header drive-type space switch 1403, there occurs no "bump" which otherwise might be caused by the fact that the cells simultaneously applied have the same distination. It is thus possible to make a simple configuration of the header drive-type space switch as shown in FIG. 15. In FIG. 15, timing circuits 150l to 15n, selectors 151l to 151n and selection address generators 152l to 152n are arranged to correspond to the respective outgoing and incoming lines, and the parts of the incoming and outgoing lines associated with the header data have all the incoming lines connected to the selection address generator, and the other parts than the incoming line headers thereof to the selectors corresponding to the respective outgoing lines through the timing circuits respectively. All the destinations of the cells applied at the same time are different from each other, and therefore, each selection address generator is supplied only with one header data with a destination address associated therewith. Upon generation of a selection address corresponding to the incoming line supplied with the particular header data, the selector performs section associated with the destination, thus performing the space switching operation in general.

Figure 16:
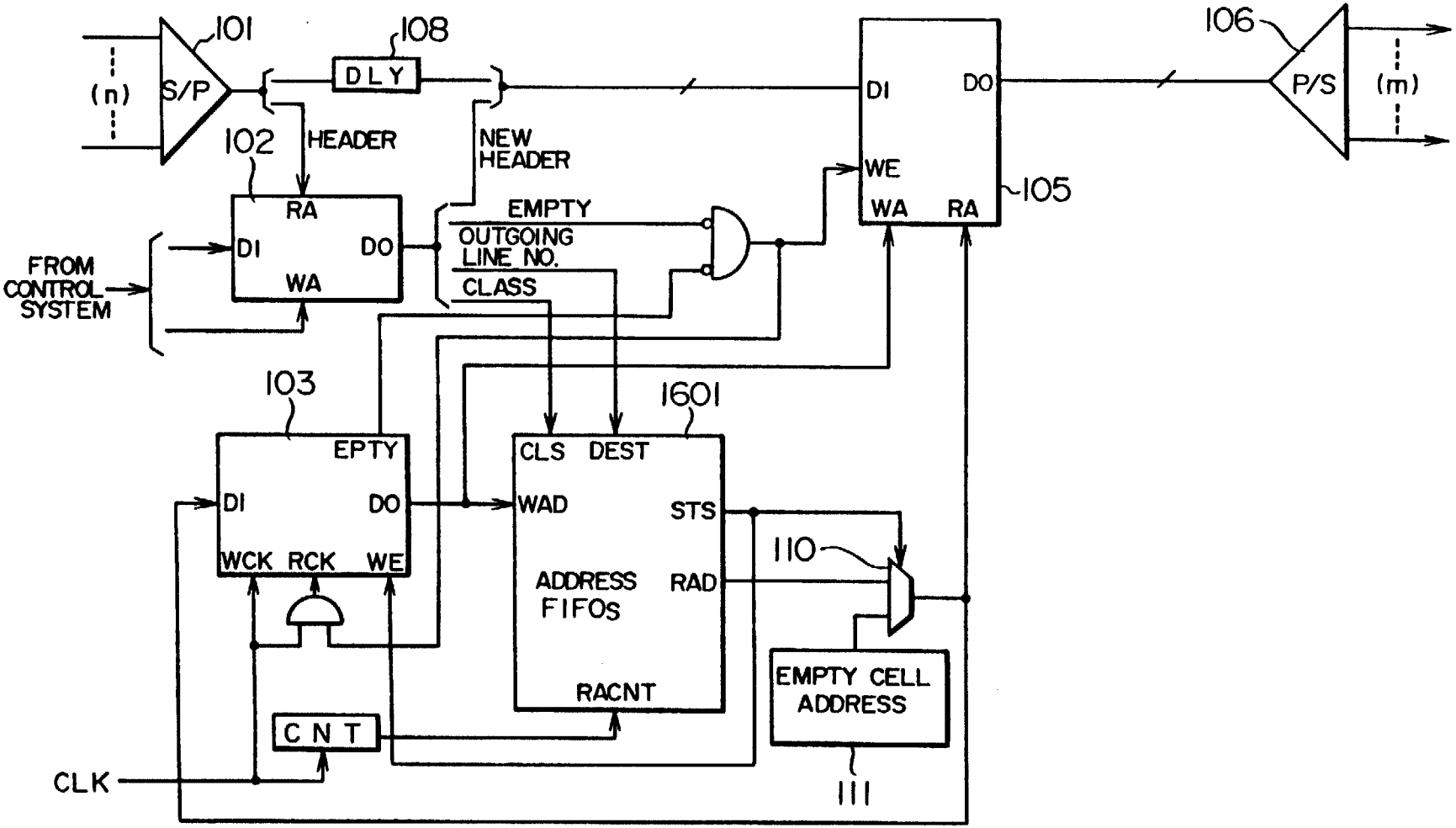
FIG. 16 is a functional block diagram showing still another embodiment of the present invention.

FIG. 16 shows the configuration of FIG. 12 having a preferential control mechanism added thereto. The data output of the header conversion table 102 has a class indication output, which is connected to the class input (CLS) of the address FIFOs 1601.

Figure 13:
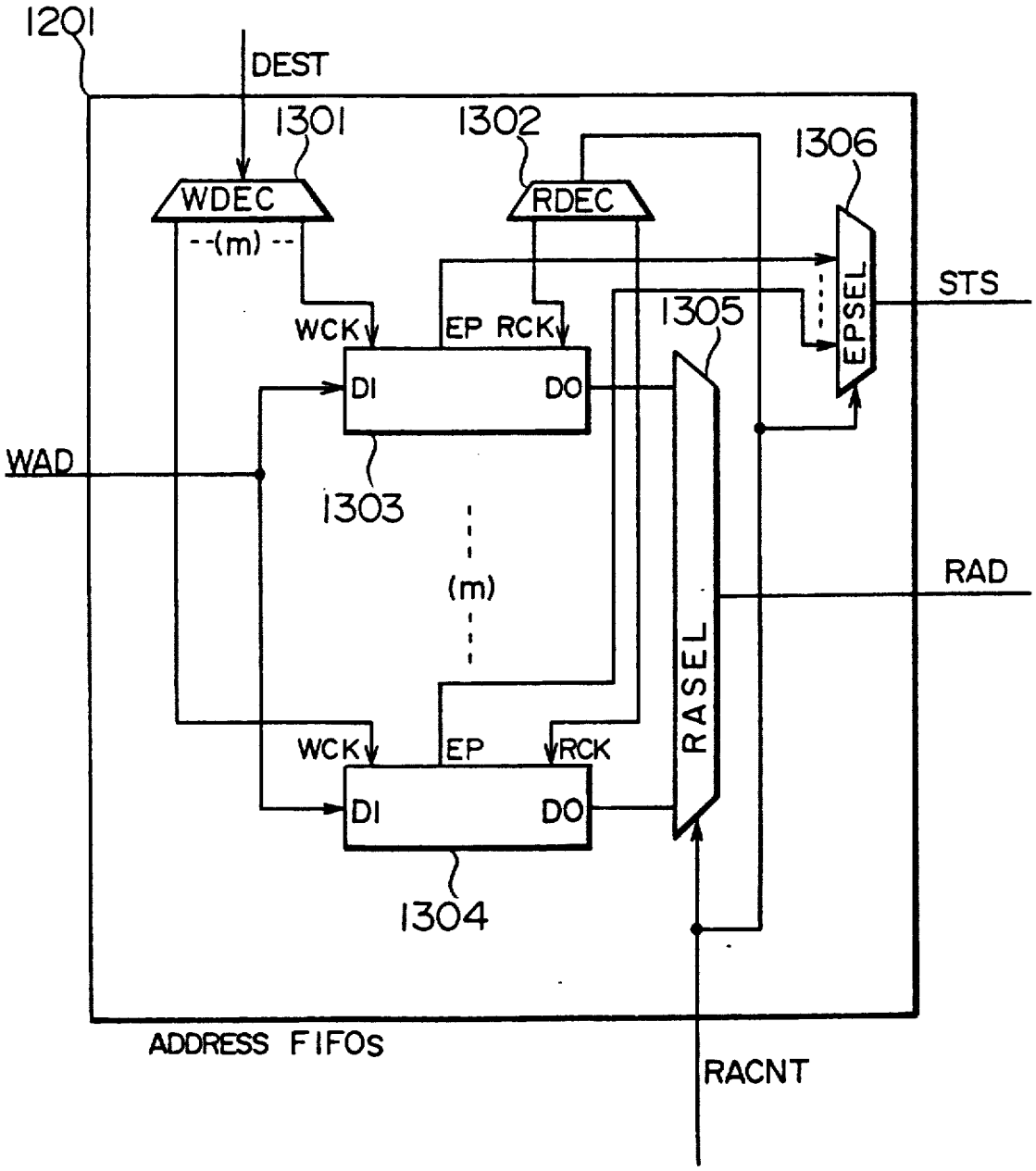
FIG. 13 is a detailed functional block diagram showing address FIFOs included in FIG. 12.
Figure 17:
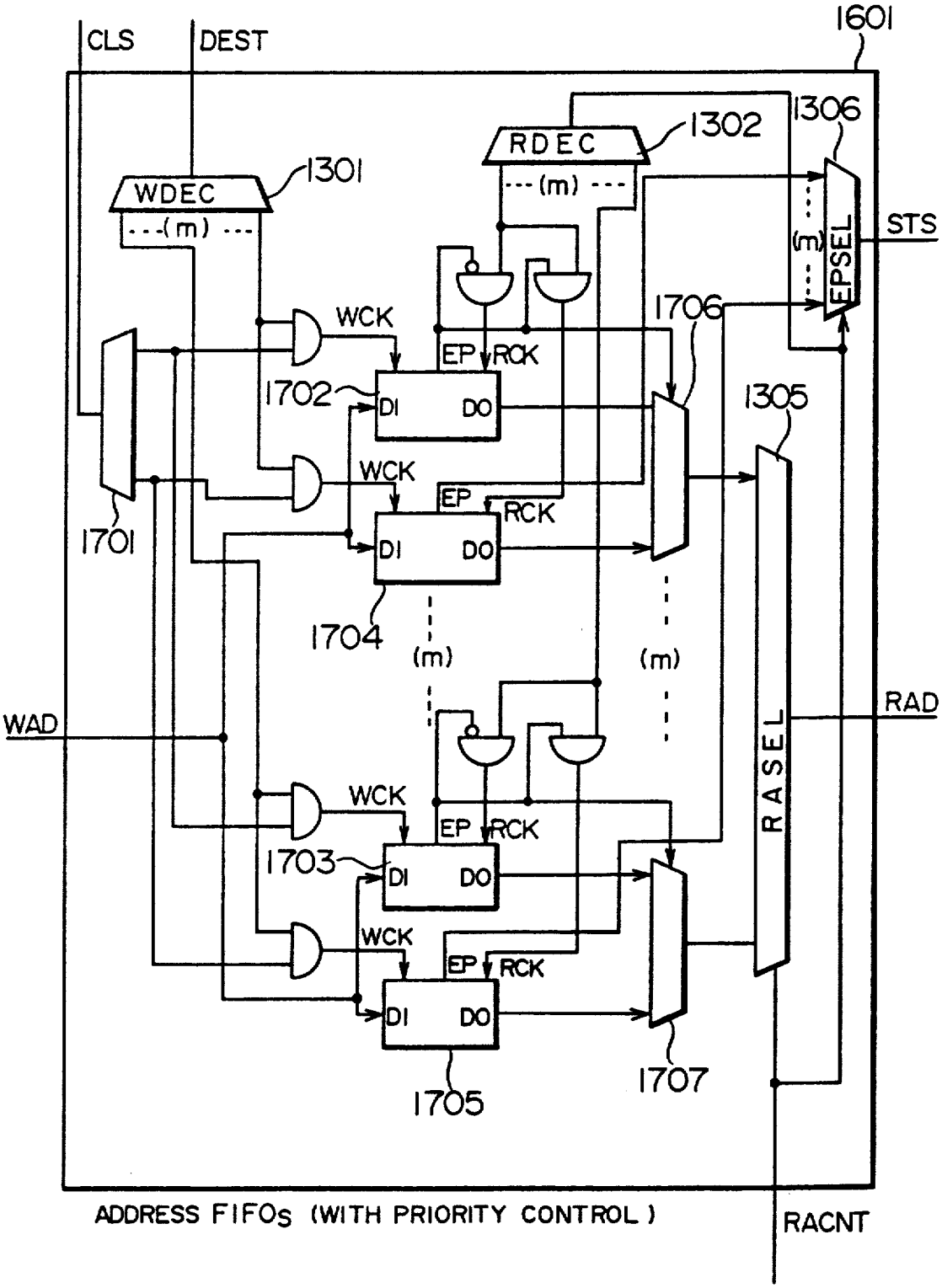
FIG. 17 is a detailed functional block diagram showing address FIFOs included in FIG. 16.

FIG. 17 is a diagram showing a configuration of the address FIFOs with the preferential control function. The component parts included in this diagram which are similar to those in FIG. 13 are not explained. According to the embodiment under consideration, there are two clases of reading order, preferential and non-preferential. Thus, there are two FIFO buffers (such as 1702 and 1704) for each outgoing line. The write signal input (WCK) of the FIFO buffer is the logical porduct of the decoder output of the outgoing line number decoder 1301 and that of the class data decoder 1701. The read signal input (RCK), on the other hand, is the logical product of the decode output of the read sequence decoder 1302 and the empty state indication output (EP) of each FIFO. According to this configuration at the time of writing a cell, the write address (WAD) is stored in a FIFO buffer associated with the outgoing line number and class thereof, while at the time of reading a cell, the read address is always produced from the FIFO on this side until the FIFO on preferential read side (such as 1702) becomes empty. And only after this FIFO becomes empty, the other FIFO (such as 1704) is read.

This embodiment has two classes of order of priority relating to the delay time. Instead, the FIFO buffers may be increased for each class to meet a multiplicity of classes. Also, the requirement for classification according to loss rate may be satisfied by controlling the capacity of the FIFO buffers.

It will thus be understood that according to the present invention there occurs no loss of a cell which otherwise might be caused when a new cell is read before a cell is read out of the main buffer. Also, all the areas of the main buffer may be used for all outgoing lines in common, and therefore the memory capacity is usable with high efficiency even if cell distinations are concentrated on a specific outgoing line. As a result, cells are not hardly discarded. This fact is especially advantageous in communications of strong burst characteristic in which cells of the same destinations arrive at a given moment.

We claim:

1. A switching system comprising a plurality of fixed-length cells each including a header section and a data section for exchanging communication message between a plurality of incoming highways and a plurality of outgoing highways on the basis of the data contained in the header section, in which a plurality of incoming highways are multiplexed in time division, the cells that arrive are written in a main buffer, and the cells thus written are read out in an appropriate order, separated in multiplex ways and distributed among a plurality of outgoing highways thereby to perform the switching and buffering operations, said switching system further comprising an idle address FIFO (First in First Out) buffer for storing an empty address of the main buffer and means for controlling the write and read operation of the main buffer, the empty idle address being retrieved out of the data output of the idle address FIFO buffer at the time of writing the cell into the main buffer, the read address being returned to the data input of the idle address FIFO buffer at the time of reading the cell from the main buffer, wherein the control means includes write registers and reads registers in the same number as the outgoing highways corresponding to the respective incoming highways, the data output of the idle address FIFO buffer is connected to the input terminals of the write registers and the data input terminal of the main buffer respectively, the output terminals of the plurality of write registers are connected to the write address terminal of the main buffer through a selector with a selection input as the destination outgoing highway number of arriving cell, the same address of the main buffer being written with an arriving cell of an address and the next-arriving cell of the same destination as the first cell of the next address as a set at the time of writing a cell into the main buffer, said next address being used to update the write register corresponding to the outgoing highway making up the destination of the particular cell, the data output terminals of the main buffer being connected to the input terminals of the respective read registers, the output terminals of the plurality of read registers being connected to the read address terminal of the main buffer through a selector with a selection input as the counter output for generating a read timing for each outgoing highway on the one hand and to the data input of the idle address FIFO on the other, the set of the cell and the next address being read and the read register associated with the highway being updated by the next address at the time of reading the cell from the main buffer, thereby switching the cells and buffering in chain for each destination outgoing highway.

2. A switching system according to claim 1, wherein arriving cells bear classes for identifying the handling conditions, different classes representing different delay times due to the cell buffering guaranteed by the switch, the switching system further comprising a plurality of sets each including a write register and a read register, said sets (referred to as "the address pointers") being in the same number as the classes, said write and read registers being in the same numbers as the highways, means selecting an address pointer to be used for the class assigned to a particular cell when the cell is written in the main buffer, means for producing a read address by selecting an address pointer of the class most severe against the delay time when the cell is read out, and means detecting the presence or absence of a waiting cue for a cell associated with a given outgoing highway of the same class and selecting the next most severe class of the address pointer in the absence of a waiting cue.

3. A circuit component part for a switching system according to claim 1, wherein the main buffer and the idle address FIFO are mounted in the same chip.

4. A circuit component part for a switching system according to claim 1, wherein the main buffer, the idle address FIFO and the control means are mounted in the same chip.

5. A switching system comprising a plurality of fixed-length cells each including a header section and a data section for exchanging communication message between a plurality of incoming highways and a plurality of outgoing highways on the basis of the data contained in the header section, in which a plurality of incoming highways are multiplexed in time division, the cells that arrive are written in a main buffer, and the cells thus written are read out in an appropriate order, separated in multiplex ways and distributed among a plurality of outgoing highways thereby to perform the switching and buffering operations, said switching system further comprising an idle address FIFO (First In First Out) buffer for storing an empty address of the main buffer and means for controlling the write and read operation of the main buffer, the empty idle address being retrieved out of the data output of the idle address FIFO buffer at the time of writing the cell into the main buffer, the read address being returned to the data input of the idle address FIFO buffer at the time of reading the cell from the main buffer, wherein each arriving cell bears a class for identifying the handling conditions, different classes representing different cell discarding rates guaranteed by the switch, the switching system further comprising an up-down counter for counting down when a specified class of cell is written in the main buffer, said counter being counted up when said cell is read out, the cells of the same class being prohibited from being written into the main buffer and the cell discarded upon detection that the count of the up-down counter becomes zero.

6. A switching system comprising a plurality of fixed-length cells each including a header section and a data section for exchanging communication message between a plurality of incoming highways and a plurality of outgoing highways on the basis of the data contained in the header section, in which a plurality of incoming highways are multiplexed in time division, the cells that arrive are written in a main buffer, and the cells thus written are read out in an appropriate order, separated in multiplex ways and distributed among a plurality of outgoing highways thereby to perform the switching and buffering operations, said switching system further comprising an idle address FIFO (First In First Out) buffer for storing an empty address of the main buffer and means for controlling the write and read operation of the main buffer, the empty idle address being retrieved out of the data output of the idle address FIFO buffer at the time of writing the cell into the main buffer, the read address being returned to the data input of the idle address FIFO buffer at the time of reading the cell from the main buffer, comprising FIFO buffers (referred to as "the address FIFOs") in the same number as the highways, in which the data output of the idle address FIFO buffer for storing an empty address of the main buffer is connected to the input terminals of a plurality of the address FIFOs and the write address input of the main buffer, the output terminals of the address FIFOs being connected to the data input of the idle address FIFO buffer and the read address terminal of the main buffer through a selector with a control counter output as a selection output.

7. A switching system according to claim 6, wherein each of the arriving cells has a class for identifying the handle conditions, different classes having different delay times due to the cell buffering guaranteed by the switch, the switching system comprising a plurality of address FIFOs in the same number as the classes for each outgoing highway, means for selecting an idle FIFO according to the class associated with a cells at the time of writing the cell in the main buffer, and means for producing a read address by selecting an address FIFO of a class having more severe conditions against the delay time at the time of reading the cell from the main buffer.

8. A switching system for exchanging communication data between a plurality of incoming highways and a plurality of outgoing highways by use of a plurality of fixed-length cells each having a header section and a data section, the system comprising header drive-type time switches corresponding to the incoming highways for replacing the chronological order of the cells according to the header data, and a header drive-type space switch for spatially replacing a cell between highways according to the header data, the output of the header drive-type time switch being connected to the header drive-type space switch, and header drivetype time switch comprising:

means for multiplexing said plurality of incoming highways in time division, means for writing the cells that arrive in a main buffer, and switching means for reading out the cells thus written in an appropriate order, separating said cells in multiplex ways and distributing said cells among a plurality of outgoing highways thereby to perform switching and buffering operations, said switching means further comprising an idle address FIFO (First In First Out) buffer for storing an empty address of the main buffer and control means for controlling the write and read operation of the main buffer, the empty idle address being retrieved out of the data output of the idle address FIFO buffer at the time of writing the cell into the main buffer, the read address being returned to the data input of the idle address FIFO buffer at the time of reading the cell from the main buffer, wherein the control means includes write registers and read registers in the same number as the outgoing highways corresponding to the respective incoming highways, the data output of the idle address FIFO buffer is connected to the input terminals of the write registers and the data input terminal of the main buffer respectively, the output terminals of the plurality of write registers are connected to the write address terminal of the main buffer through a selector with a selection input as the desination outgoing highway number of arriving cell, the same address of the main buffer being written with an arriving cell of an address and the next-arriving cell of the same destination as the first cell of the next address as a set at the time of writing a cell into the main buffer, said next address being used to update the write register corresponding to the outgoing highway making up the destination of the particular cell, the data output terminals of the main buffer being connected to the input terminals of the respective read registers, the output terminals of the plurality of read registers being connected to the read address terminal of the main buffer through a selector with a selection input as the counter output for generating a read timing for each outgoing highway on the one hand and to the data input of the idle address FIFO on the other, the set of the cell and the next address being read and the read register associated with the highway being updated by the next address at the time of reading the cell from the main buffer, thereby switching the cells and buffering in chain for each destination outgoing highway.

9. A switching system for exchanging the communication data between a plurality of incoming highways and a plurality of outgoing highways by use of a plurality of fixed-length cells including a header section and a data section, the system comprising header drive-type time switches corresponding to the incoming highways, respectively, for replacing the chronological order of cells according to the header data, and a header drive-type space switch for replacing the cells spatially between the highways according to the header data, the output of the header driver-type time switch being connected to the input terminals of the header drive-type space switch, said header drive-type time switch comprising:

means for multiplexing said plurality of incoming highways in time division, means for writing the cells that arrive in a main buffer, and switching means for reading out the cells thus written in an appropriate order, separating the cells in multiplex ways and distributing the cells among a plurality of outgoing highways thereby to perform the switching and buffering operations, said switching means further comprising an idle address FIFO (First In First Out) buffer for storing an empty address of the main buffer and control means for controlling the write and read operation of the main buffer, the empty idle address being retrieved out of the data output of the idle address FIFO buffer at the time of writing the cell into the main buffer, the read address being returned to the data input of the idle address FIFO buffer at the time of reading the cell from the main buffer, comprising FIFO buffers (referred to as "the address FIFOs") in the same number as the highways, in which the data output of the idle address FIFO buffer for storing an empty address of the main buffer is connected to the input terminals of a plurality of the address FIFOs and the write address input of the main buffer, the output terminals of the address FIFOs being connected to the data input of the idle address FIFO buffer and the read address terminal of the main buffer through a selector with a control counter output as a selection output.

10. In a three-stage link switch comprising a plurality of unit switches connected in multiple stages for exchanging the communication data between a given number of incoming terminals and a given number of outgoing terminals, a multi-stage switch comprising a first stage including a plurality of unit switches (primary switches) each having an integral number m of incoming lines, an integral number r of outgoing lines and the ratio of 1 to x between the incoming line speed and the outgoing line speed, where x is the link speed ratio, a middle stage including a plurality of unit switches (secondary switches) each having an integral number k of incoming lines and an integral number k of outgoing lines, and the ratio of 1 to 1 between the incoming line speed and the outgoing line speed, and a final stage including a plurality of unit switches (tertiary switches) each having an integral number r of incoming lines, an integral number m of outgoing lines, and the ratio of x to 1 between the incoming line speed and the outgoing line speed, the primary switches being in the number of k, the secondary switches in the number of r, and the tertiary switches being in the number of k, the r outgoing lines of the primary switches being connected to the secondary switches respectively, the k outgoing lines of the secondary switches being connected to the tertiary switches respectively, the switch being constructed so 1014 as to satisfy the relationship $r \geqq 2\{[(m-1)/(x-1)]-1\}+1$ where the symbol $[(m-1)/(x-1)]$ indicates the minimum integral number equal to or larger than $(m-1)/(x-1)$.

11. A multi-stage message chnnale switch according to claim 10, further comprising a packet including a header section and a data section, said communication data being exchanged with reference to the data contained in the header section of the packet.

12. A multi-stage message channel switch according to claim 10, wherein $r=2m-3$ and $x=2$.

13. A multi-stage message channel switch according to claim 10, wherein $r=m-2$ and $x=3$.

14. A switching system for handling a plurality of fixed-length cells, each fixed length cell including a header section and a data section, and for exchanging a communication message contained in the data section of the cell between a plurality of incoming highways and a plurality of outgoing highways according to the data contained in the header section of the cell, comprising:

means for multiplexing said incoming highways in time division;

first memory means having addressable storage location for storing cells received from said multiplexing means;

means for demultiplexing and distributing data output from said first memory means among a plurality of outgoing highways;

second memory means for storing an empty address of an empty storage location of the first memory means; and means for controlling the write and read operations of said first memory means in accordance with an empty address stored in the second memory means.

15. A switching system according to claim 14, wherein said controlling means includes first means for storing in said first memory means an empty address from said second memory means as a next address along with a cell received from said multiplexing means, and means for storing said empty address for use as a write address to store the next cell received from said multiplexing means for a given outgoing highway in said first memory means.

16. A switching system according to claim 15, wherein said controlling means further includes second means for storing a next address read out of said first memory means at the time a cell is read out of said first memory means for a given outgoing highway, and means for reading another cell from said first memory means for said given outgoing highway using the address stored in said second means.

17. A switching system according to claim 16, wherein said controlling means also includes means for storing said address in said second means into said second memory means when that address is used to read said another cell from said first memory means.

18. A switching system for handling a plurality of fixed-length cells, each fixed-length cell including a header section and a data section, and for exchanging a communication message contained in the data section of the cell between a plurality of incoming highways and a plurality of outgoing highways according to the data contained in the header section of the cell, comprising:

means for multiplexing said incoming highways in time division;

a main buffer connected to said multiplexing means and having a plurality of addressable storage locations for storing cells which arrive from said multiplexing means;

means for demultiplexing and distributing data output from the main buffer among a plurality of outgoing highways;

an idle address FIFO buffer for storing an address of an empty storage location in the main buffer; and means for controlling the write and read operations of the main buffer in accordance with an address stored in said idle address FIFO buffer, including means for storing the data output of the idle address FIFO buffer in the main buffer [at the time of writing the cell into the main buffer] at the time of writing the cell into the main buffer, and for applying a read address used in reading a cell from the main buffer to the data input of the idle address FIFO buffer for storage therein at the time of reading a cell from the main buffer.

19. A switching system according to claim 18, wherein said main buffer comprises a random access memory.

20. A switching system according to claim 18, wherein said controlling means includes means for controlling write addresses for writing cells into said main buffer according to a destination outgoing highway of the particular cell, so that a cell designated to a given outgoing highway can be read out of said main buffer selectively.

*21. A switching system for handling a plurality of fixed length cells, each fixed length cell including a header section and an information section, to exchange information contained in the information section of cells between a plurality of incoming highways and a plurality of outgoing highways according to an identifier contained in the header section of the cells, comprising:*

*a serial/parallel converter for converting said incoming highways from serial to parallel;*

*a memory having a plurality of addressable storage locations for storing cells received from said serial/-parallel converter;*

*a parallel/serial converter for distributing cells received from said memory to said outgoing highways;*

*a storage for storing addresses of empty storage locations of said memory; and*

*a controller for controlling at least one of write and read operations of said memory in accordance with addresses stored in said storage.*

*22. A switching system according to claim 21, wherein said controller includes first means for storing in said memory an empty storage location address from said storage as a next address along with a cell received from said serial/parallel converter, and means for storing said empty storage location address for use as a write address to store in said memory the next cell received from said serial/parallel converter for a given outgoing highway.*

*23. A switching system according to claim 22, wherein said controller further includes second means for storing a next address read out of said memory in response to a cell being read out of said first memory for a given outgoing highway, and means for reading another cell from said memory for said given outgoing highway using an address stored in said second means.*

*24. A switching system according to claim 23, wherein said controller also includes third means for storing said address stored in said second means also into said storage in response to that address being used to read said another cell from said memory.*

*25. A switching system for handling a plurality of fixed length cells, each fixed length cell including a header section and an information section, to exchange information contained in the information section of cells between a plurality of incoming highways and a plurality of outgoing highways according to an identifier contained in the header section of the cells, comprising:*

*a serial/parallel converter for converting said incoming highways from serial to parallel;*

*a buffer connected to receive cells from said serial/parallel converter and having a plurality of addressable storage locations for storing said cells;*

*a parallel/serial converter for distributing cells received from said buffer to said outgoing highways;*

*an idle address FIFO storage for storing addresses of empty storage locations in said buffer;*

*a controller for controlling at least one of write and read operations of the buffer in accordance with addresses stored in said idle address FIFO storage, including means for storing an address from the idle address FIFO storage into the buffer in conjunction with the writing of a cell into the buffer and for applying a read address used in reading a cell from the buffer to said idle address FIFO storage so as to be stored therein.*

*26. A switching system according to claim 25, wherein said buffer comprises a random access memory.*

*27. A switching system according to claim 25, wherein said controller includes means for controlling write addresses for writing cells into said buffer according to a destination outgoing highway of the particular cell.*

*28. A switching method for handling a plurality of fixed length cells, each fixed length cell including a header section and an information section, to exchange information contained in the information section of cells between a plurality of incoming highways and a plurality of outgoing highways according to an identifier contained in the header section of the cells, comprising:*

*(a) supplying cells in sequence to an addressable buffer memory for storage in respective storage locations of said buffer memory according to respective write addresses;*

*(b) reading cells from a respective storage locations of said buffer memory in accordance with respective read addresses;*

*(c) storing in a storage addresses of empty storage locations of said buffer memory; and*

*(d) determining one of said write addresses and said read addresses in accordance with addresses stored in said storage.*

*29. A switching system for handling a plurality of fixed-length cells, each fixed length cell including a header section and an information section, and for exchanging communication information contained in the information section of a cell between a plurality of incoming highways and a plurality of outgoing highways according to data contained in the header section of the cell, comprising:*

*means for multiplexing cells in said incoming highways in time division;*

*first memory means for storing cells received from said multiplexing means;*

*means for demultiplexing data output from said first memory means among a plurality of outgoing highways;*

*second memory means for storing an address of an empty storage location of the first memory means; and*

*means for controlling the write and/or read operations of said first memory means in accordance with an address stored in the second memory means.*

*30. A switching system for handling a plurality of fixed-length cells, each fixed-length cell including a header section and an information section, and for exchanging communication information contained in the information section of the cell between a plurality of incoming highways and a plurality of outgoing highways according to the data contained in the header section of the cell, comprising:*

*means for multiplexing said incoming highways in time division;*

*first memory means connected to said multiplexing means for storing cells which arrive from said multiplexing means;*

*means for demultiplexing data output from the first memory means among a plurality of outgoing highways;*

*second memory means for storing an address of an empty storage location in the first memory means; and*

*means for controlling the write and/or read operations of the first memory means in accordance with an address stored in said second memory means, including means for storing data output from the second memory means into the first memory means at the time of writing a cell into the first memory means and for applying a read address used in reading a cell from the first memory means to the data input to the second memory means for storage therein at the time of reading a cell from the first memory means.*

* * * * *